Nov. 22, 1938.　　　J. P. JEFFCOCK　　　2,137,912
RADIO DIRECTION FINDING SYSTEM
Filed Nov. 22, 1937　　　2 Sheets—Sheet 1

INVENTOR

BY J. P. JEFFCOCK,

ATTORNEYS

Nov. 22, 1938.   J. P. JEFFCOCK   2,137,912
RADIO DIRECTION FINDING SYSTEM
Filed Nov. 22, 1937   2 Sheets-Sheet 2
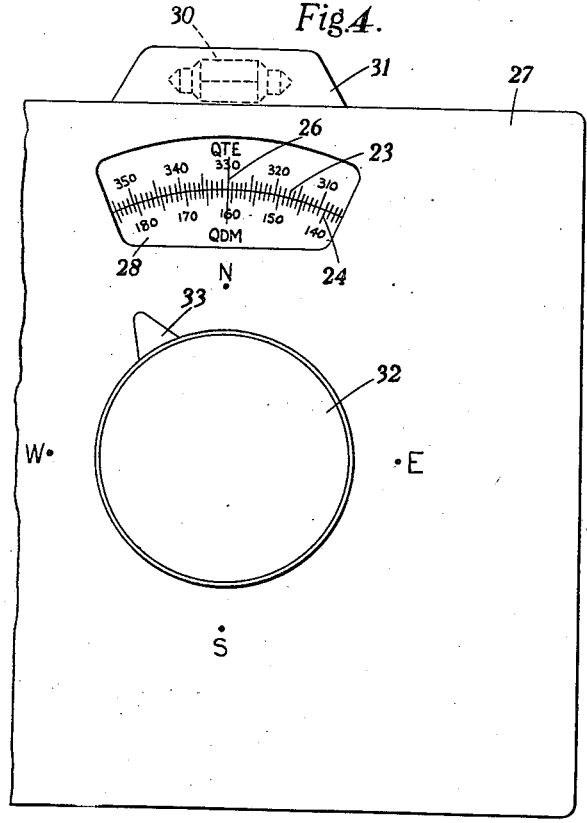
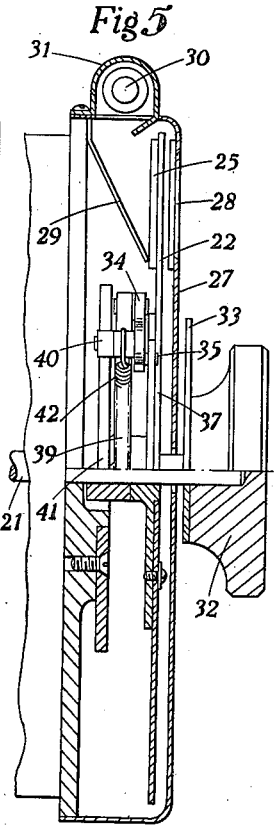
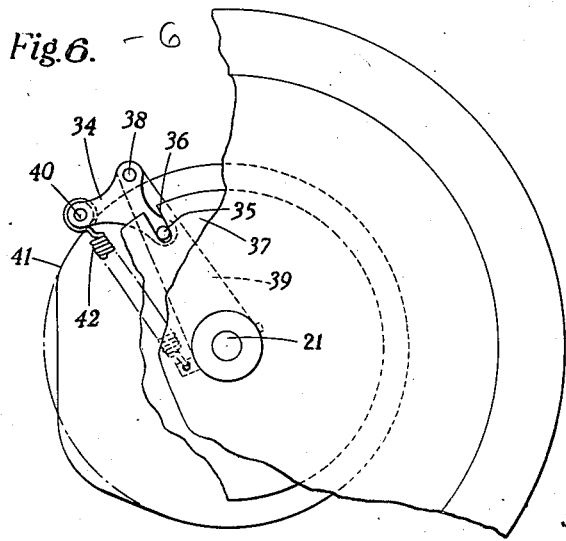
INVENTOR
J. P. JEFFCOCK
BY
ATTORNEYS Patented Nov. 22, 1938

2,137,912

UNITED STATES PATENT OFFICE 2,137,912

RADIO DIRECTION FINDING SYSTEM

John Parkyn Jeffcock, Surbiton, England

Application November 22, 1937, Serial No. 175,913
In Great Britain November 14, 1936

1 Claim. (Cl. 250—11)

This invention relates to radio direction finding systems, and in particular, to radiogoniometers which may be required to indicate the direction of an aircraft in flight.

Rotatable directional aerials and radiogoniometers in conjunction with directional aerial systems, have been used for many years in radio stations offering direction finding services to ships, and latterly, similar instruments have been used in aeronautical ground stations for the assistance of aircraft, especially when flying at night or in bad visibility.

Heretofore, the design of aeronautical radiogoniometers has been based upon that of the original maritime instruments, and has embodied the following main components: a search coil mounted diametrically on a spindle capable of rotation, and located at the centre of two stator or field coils mounted in quadrature about the axis of rotation of the search coil: an operating handle mounted on the spindle, and a pointer rigidly fixed to the spindle for indicating the true bearings of aircraft on a simple concentric scale, and an additional pointer mounted on the same spindle at 90 degrees from the true bearing pointer, for indicating the "sense" of bearings.

The conditions which govern the operation of aeronautical and maritime radio direction finding systems differ considerably because of the rapidity with which the bearings of aircraft must be determined. For instance, several minutes are allowed for the determination of a ship's bearing, because of its relatively low speed, say 20 to 30 miles per hour, and because it is usually at an appreciable distance from the direction finding station. Aircraft, however, may be travelling at more than 200 miles per hour, and when visibility is bad, a rapid series of bearings may be necessary at intervals of a few seconds and at short distances from the direction finding station and the aerodrome at which a landing is to be made. It will be appreciated, therefore, that the bearings of aircraft must be determined in the shortest possible time and that heretofore, aeronautical radiogoniometers based on the maritime design, have not been well suited for rapid operation.

The object of the present invention is to provide facilities for making accurate bearing measurement after determining the correct "sense", without rotating the control knob of the direction finding apparatus through 90 degrees between the two operations.

In order that the invention may be more clearly understood reference will now be made to the accompanying drawings in which Figures 1a and 1b illustrate polar diagrams of the known systems.

Figures 4, 5 and 6 illustrate various views of a dial assembly for use with radiogoniometers according to this invention.

In known systems the "sense" of a bearing is determined by combined signals from a non-directional aerial system with those from the directional aerial system in a manner well-known to those skilled in the art in order to produce a cardioid polar diagram, the minimum of which is normally displaced by 90 degrees from either minimum produced by the same signal and the directional aerial system alone. With such systems as hitherto employed, the control knob of the radiogoniometer has been provided with two indicating pointers arranged at 90 degrees with reference to one another and the knob has to be turned through 90 degrees for determining the true minimum using the directional aerial system only after the "sense" of the bearing has been determined by the combined use of the directional aerial and non-directional aerial systems.

Figure 1A:
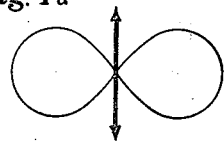
Figure 1B:
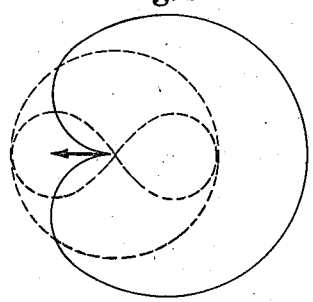

For example, as shown in Figures 1a and 1b, the direction of the minimums using the directional aerial system only are shown by the arrows on the polar diagram in Figure 1a whereas the "sense" direction when using the cardioid polar diagram is shown by the arrow in Figure 1b and is at right angles to the minimums or actual direction of the signal, the bearing of which is to be determined.

According to the present invention, the "sensing" switch which alters the circuit to produce a cardioid polar diagram is also arranged to interchange the connections to the two radiogoniometer field coils.

Figure 2:
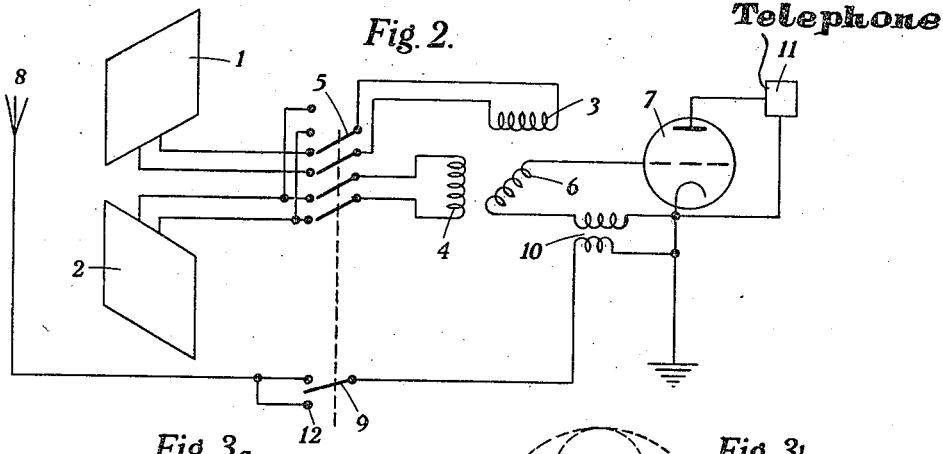
Figure 2 illustrates a circuit arrangement according to the invention.

As shown in Figure 2, the two loop antennae 1 and 2 arranged at right angles to one another are connected to the field coils 3 and 4 of the radiogoniometer through a changeover or "sensing" switch 5 which in one position connects the aerial 1 to the field coil 3 and the aerial 2 to the field coil 4, and in the other position reverses these connections. The rotatable search coil 6 of the goniometer is connected to the amplifying valve 7, the output of which is fed to the indicating instrument 11, such as a telephone receiver, in known manner.

8 is the non-directional aerial system which is coupled when the switch 9 is closed through a transformer 10 to the valve 7. The switch 9 is coupled to operate with the "sensing" switch 5 so that in one position of the switch 5, the switch 9 is open and in the other or "sense" position of the switch 5, the switch 9 is closed.

Figure 3A:
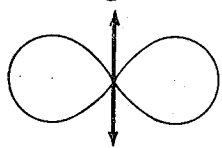
Figures 3a and 3b illustrate polar diagrams according to the invention.
Figure 3B:
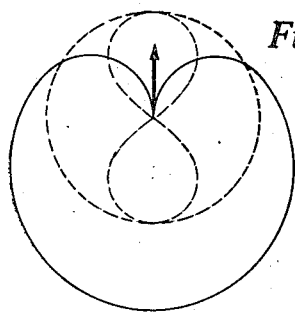

Thus when the switch 5 is in the lower position shown, the valve 7 operates in accordance with the signals received by the directional antennae 1 and 2 only, and minimums on the "figure 8" polar diagram can be indicated (Fig. 3a). When the switch 5 is moved to its upper position, the field coils 3 and 4 are reversed whereby the "figure 8" polar diagram is rotated through 90 degrees. Simultaneously the signal received by the non-directional aerial system 8 is applied to the valve 7 due to the closing of the switch 9 so that the cardioid polar diagram then produced is rotated through 90 degrees with respect to the polar diagram produced by the hitherto known radiogoniometers (see Fig. 3b) whereby it is unnecessary to rotate the radiogoniometer control knob through 90 degrees between the taking of the "sense" and true bearing measurements.

The switches 5 and 9 should be so arranged that a third position is provided in which the antennae 1 and 2 are disconnected from the radiogoniometer field coils whilst the non-directional aerial is connected to the amplifier, for example through the contact 12 so that whilst waiting for a signal, the signals received by the non-directional aerial system only are fed to the amplifying valve 7. As soon as a signal is heard the sensing switch is first moved to the "sense" position and subsequently to the position for accurately determining the true minimum. The switch 5 may be spring-loaded so that it automatically returns to the "figure 8" position when finger pressure is removed. Thus in taking a bearing, the switch is held for a moment in the cardioid position whilst the approximate minimum is found, and the switch is then released and the minimum position is determined accurately.

Since, by means of this invention, it is not necessary to turn the control knob when indicating "sense" and true bearings, it is thus possible to employ a rotatable scale coupled to the control knob and visible through an aperture where an index mark is arranged. It is therefore only necessary for the operator to concentrate his attention on this small area of the scale, which, moreover, may be easily illuminated from behind.

Furthermore, the invention leads to the possibility of employing means for the automatic compensation of site error, whereby actual bearings or reciprocals may be read directly from an evenly divided scale.

A control knob assembly embodying these features of the invention is shown in Figures 4-6 of the drawings.

The radiogoniometer spindle 21 carries a transparent rotatable circular dial 22 on which two circular scales 23, 24 are marked near the periphery. Both scales are divided in degrees and the outer diameter of the inner scale is coincident with the inner diameter of the outer scale; the markings on the inner scale are displaced from the equivalent markings on the outer scale by 180 degrees plus the appropriate magnetic variation which is about 11 degrees. The radiogoniometer is preferably located so that the dial faces the operator in a sloping or vertical plane, and at the top of the dial a background of transparent or translucent material 25 is located centrally behind the scales so as to cover a total arc of about 50 degrees. A radial line 26 is provided at the front surface of the background 25 which is almost in contact with the dial 22, and in conjunction with the outer and inner scales, the line indicates true bearings or magnetic reciprocals respectively. In aeronautical radio communication, true bearings and magnetic reciprocals are commonly denoted by the code groups QTE and QDM respectively and these abbreviations are marked on the background 25 at the outer and inner ends of the indicating line 26 respectively. The two scales and corresponding designations are preferably marked in different colours for instance QTE and the outer scale in black, and QDM and inner scale in red.

The radiogoniometer dial is enclosed in a protective cover 27 with a transparent window 28 through which the background 25 and its markings together with the associated part of the dial 22 can be viewed. The scale background is evenly illuminated from behind, preferably by means of a reflector 29 and a lamp 30 which is located in a detachable housing 31 and can be replaced without removing the radiogoniometer cover. Magnetic bearings and true reciprocals are only required infrequently but to facilitate their determination the appropriate code groups are marked on the radiogoniometer cover at each side of the window; thus, on the left QDR=QTE+11° is marked in black and on the right, QUJ=QDM−11° is marked in red, assuming 11° to be the magnetic variation at the site in question. The radiogoniometer spindle 21 projects through the cover 27 and attached to it is a control knob 32 and small pointer 33 which serves to indicate the general direction of an aircraft relative to the cardinal points of the compass which are marked on the radiogoniometer cover.

For the purpose of compensating for site error, the dial 22 is capable of rotation relative to the radiogoniometer spindle 21, the relative leading or lagging angle being determined by a bell crank 34 with a projection 35 which engages a radial slot 36 in the member 37 carrying the dial. The pivot 38 of the bell crank 34 is carried on an arm 39 which is rigidly fixed to the radiogoniometer shaft 21, and one extremity of the bell crank 34 carries a roller 40 which engages with the periphery of a concentric cam plate 41 of approximately circular form. Pressure between the roller and the cam surface is maintained by a suitable spring 42 so that the roller follows the cam undulations whose amplitude, sign and position are arranged to compensate for the constant site errors of the particular direction finding station at every position of the radiogoniometer knob. Thus in the absence of site errors the cam would be circular, consequently upon rotating the radiogoniometer knob there would not be any relative movement between the bell crank and its supporting arm and the dial would not be advanced or retarded relative to the radiogoniometer spindle. If necessary a new cam may readily be substituted when the station calibration is checked.

I claim:

A radio direction finding system comprising a directional aerial system consisting of two directional antennae, a radiogoniometer coupled with said directional antennae for direction finding purposes, field coils in said radiogoniometer interchangeably connectable with said directional antennae through the intermediary of a switching device, a non-directional aerial system, an indicating apparatus, an auxiliary switch for selectively connecting and disconnecting said last-mentioned aerial system to said indicating apparatus, said switching means adapted to connect to said indicating apparatus either the directional aerial system alone for determination of direction or both the directional aerial system and the non-directional aerial system for determination of "sense", and means coupling said switching device with said auxiliary switch for simultaneous operation for interchanging the connections between the directional antennae and the field coils of the radiogoniometer whereby the polar diagram of reception of the directional aerial system is turned through such an angle when the switch position is changed that the directional indications for the determination of direction and "sense" are substantially coincident.

JOHN PARKYN JEFFCOCK.